(12) United States Patent
Tanabe et al.

(10) Patent No.: US 11,889,888 B2
(45) Date of Patent: Feb. 6, 2024

(54) SHOE SOLE MEMBER AND SHOE

(71) Applicant: ASICS CORPORATION, Kobe (JP)

(72) Inventors: Tatsuro Tanabe, Kobe (JP); Kenta Moriyasu, Kobe (JP); Shinsaku Wakasugi, Kobe (JP)

(73) Assignee: ASICS CORPORATION, Kobe (JP)

( * ) Notice: Subject to any disclaimer, the term of this patent is extended or adjusted under 35 U.S.C. 154(b) by 14 days.

(21) Appl. No.: 17/271,179

(22) PCT Filed: Aug. 30, 2018

(86) PCT No.: PCT/JP2018/032160
§ 371 (c)(1),
(2) Date: Feb. 24, 2021

(87) PCT Pub. No.: WO2020/044506
PCT Pub. Date: Mar. 5, 2020

(65) Prior Publication Data
US 2021/0251334 A1    Aug. 19, 2021

(51) Int. Cl.
*A43B 13/18* (2006.01)
*A43B 13/04* (2006.01)

(52) U.S. Cl.
CPC ............ *A43B 13/187* (2013.01); *A43B 13/04* (2013.01)

(58) Field of Classification Search
CPC ..... A43B 13/187; A43B 13/04; A43B 13/122; B29D 35/0009
See application file for complete search history.

(56) References Cited

U.S. PATENT DOCUMENTS

| | | | | |
|---|---|---|---|---|
| 2,259,687 A | * | 10/1941 | Fisch | A43D 8/006 264/293 |
| 2,744,340 A | * | 5/1956 | Gerber | A43B 3/102 264/269 |
| 3,698,107 A | * | 10/1972 | Fukuoka | A43B 23/25 D2/917 |
| 2007/0204482 A1 | * | 9/2007 | Gibson-Collinson | A43B 7/125 36/55 |

(Continued)

FOREIGN PATENT DOCUMENTS

CN     104797392 A     7/2015
EP       2848144 A1    3/2015

(Continued)

OTHER PUBLICATIONS

WO-2017115840 Machine Translation PDF, translated on Apr. 17, 2022 via Espacenet and formatted to add line and page numbers for clarity by the Examiner (Year: 2017).*

(Continued)

*Primary Examiner* — Heather Mangine
*Assistant Examiner* — Raquel M. Weis
(74) *Attorney, Agent, or Firm* — Studebaker & Brackett PC

(57) ABSTRACT

In the present invention, a shoe sole member is composed of a foam that has a non-foamed film having a thickness of 50 µm or more on a lateral surface of the foam constituting at least a part of an outer peripheral surface of the shoe sole, in order to provide the shoe sole member composed of the foam having both stiffness and shock absorbing properties and provide a shoe excellent in shock absorbing properties.

17 Claims, 9 Drawing Sheets

(56) References Cited

U.S. PATENT DOCUMENTS

| | | | |
|---|---|---|---|
| 2011/0179679 A1* | 7/2011 | Clark | A43B 1/0072 36/30 R |
| 2012/0151793 A1* | 6/2012 | Lin | A43B 7/148 36/28 |
| 2014/0017450 A1* | 1/2014 | Baghdadi | B29C 44/445 264/109 |
| 2014/0259789 A1* | 9/2014 | Dojan | A43B 7/1445 36/103 |
| 2015/0082668 A1 | 3/2015 | Nonogawa et al. | |
| 2015/0128359 A1 | 5/2015 | Baghdadi et al. | |
| 2015/0273778 A1* | 10/2015 | Campos | B29C 51/12 12/142 T |
| 2016/0039162 A1 | 2/2016 | Murphy et al. | |
| 2017/0027281 A1* | 2/2017 | Liang | A43B 23/026 |
| 2017/0265565 A1* | 9/2017 | Connell | A43B 13/125 |
| 2017/0306539 A1* | 10/2017 | Gladish | D04H 1/76 |
| 2018/0199667 A1* | 7/2018 | Wang | A43B 13/12 |
| 2019/0016079 A1 | 1/2019 | Tanabe et al. | |

FOREIGN PATENT DOCUMENTS

| | | | |
|---|---|---|---|
| JP | S55-163806 U | 11/1980 | |
| JP | 2003-245103 A | 9/2003 | |
| JP | 2010-246785 A | 11/2010 | |
| JP | 2017-523928 A | 8/2017 | |
| JP | 2018-033677 A | 3/2018 | |
| WO | 2017/115840 A1 | 7/2017 | |
| WO | WO-2017115840 A1 * | 7/2017 | ............. A43B 13/00 |

OTHER PUBLICATIONS

International Search Report issued in PCT/JP2018/032160; dated Nov. 27, 2018.

The extended European search report issued by the European Patent Office dated Jun. 22, 2021, which corresponds to European Patent Application No. 18932021.1-1005 and is related to U.S. Appl. No. 17/271,179.

An Office Action mailed by China National Intellectual Property Administration dated Aug. 27, 2021, which corresponds to Chinese Patent Application No. 201880096826.9 and is related to U.S. Appl. No. 17/271,179; with English language translation.

International Preliminary Report On Patentability issued in PCT/JP2018/032160; dated Feb. 24, 2021.

An Office Action; "Notice of Reasons for Refusal", mailed by the Japanese Patent Office dated Apr. 16, 2021, which corresponds to Japanese Patent Application No. 2020-539958 and is related to U.S. Appl. No. 17/271,179; with English language translation.

An Office Action mailed by China National Intellectual Property Administration dated Feb. 25, 2022, which corresponds to Chinese Patent Application No. 201880096826.9 and is related to U.S. Appl. No. 17/271,179 with English language translation.

* cited by examiner

SHOE SOLE MEMBER AND SHOE

FIELD

The present invention relates to a shoe sole member and a shoe, more specifically, to a shoe sole member used as, for example, a midsole or an outsole, and a shoe including such a shoe sole member.

BACKGROUND

Shoes used for various competitions conventionally include uppers 2x and shoe soles, as shown in FIG. 10. The shoes 1x are composed of a number of parts. For example, the shoe 1x is composed of shoe sole members such as an inner sole (not shown), a sock liner (not shown), a midsole 3x, and an outsole 4x. Conventionally, the shoe sole members of this type have been demanded to be excellent in lightweight properties and shock absorbing properties. Therefore, many of the shoe sole members are composed of a foam obtained by foaming a polymer composition including, as a main component, a polymer such as rubber or a plastic. In this regard, Patent Literature 1 below describes that a member called a shank member is used in addition to a midsole composed of a foam in order to improve characteristics such as shock absorbing properties. Patent Literature 1 below further describes that the shank member is formed of a resin that is harder and more elastic than the resin used to form the midsole, to cause the shoe sole to exhibit reasonable stiffness. As shown in the figure, a shank member 51x formed of a hard resin is usually arranged in a midfoot portion to rise from an outer peripheral portion of the shoe sole to function as a reinforcing member for firmly holding a foot. Known examples of the reinforcing member of this type include a member called a stabilizer 52x arranged in a forefoot portion, and a member called a heel counter 53x arranged in a hindfoot portion.

CITATION LIST

Patent Literature

Patent Literature 1: JP 2010-246785 A

SUMMARY

Technical Problem

The shoe sole including a shoe sole member composed of a foam with an improved stiffness against bending or torsion as compared with a conventional foam can fulfill a function similar to that fulfilled when a reinforcing member such as a shank member is used. That is, provision of such a foam not only enables the reinforcing member to reduce its size and thickness to thereby obtain lightweight shoes, but also enables the use of special members such as the reinforcing member to be omitted in some cases. A possible way to improve the stiffness of the foam can be to select a hard resin as a forming material of the foam, or to reduce the expansion ratio of the foam. However, in such cases, the stiffness against bending and torsion can be improved, but there is a possibility of impairing the characteristics such as lightweight properties and shock absorbing properties. It has been thus difficult to obtain a shoe sole member composed of a foam having both stiffness and shock absorbing properties. It is therefore an object of the present invention to provide such a shoe sole member, and further to provide a shoe excellent in shock absorbing properties.

Solution to Problem

In order to solve the above problem, the present invention provides a shoe sole member composed of a foam, the foam composed of a polymer composition and having a surface composed of a non-foamed film at least partially having a thickness of 50 μm or more, the foam having a lateral surface constituting at least a part of an outer peripheral surface of the shoe sole and a bottom surface extending inward from a lower end of the lateral surface, and the lateral surface including the film continuously extending from the lateral surface to the bottom surface.

Further, in order to solve the above problem, the present invention provides a shoe including the shoe sole member as aforementioned.

DESCRIPTION OF EMBODIMENTS

Figure 1:
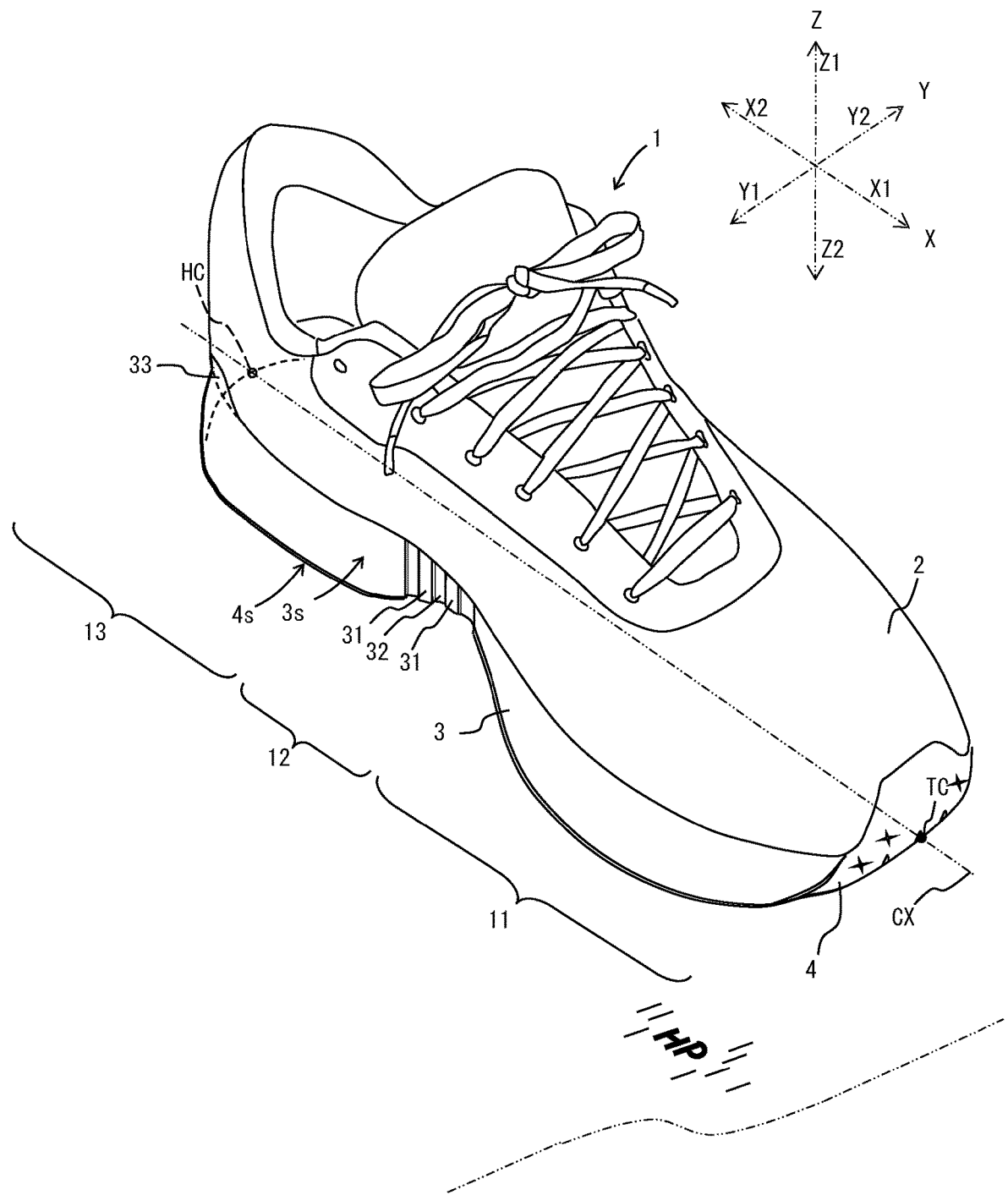
FIG. 1 is a schematic perspective view showing a shoe including shoe sole members.

A shoe sole member of the present invention will be described below by showing an embodiment thereof. A description will be hereinafter given by taking a midsole as an example of the shoe sole member of the present invention. FIG. 1 shows a shoe formed using shoe sole members of this embodiment. The shoe 1 includes an upper 2 and a shoe sole. The shoe sole is composed of a plurality of shoe sole members. The shoe 1 includes a midsole 3 and an outsole 4 as the shoe sole members. Hereinafter, when a description is given on the shoe 1 shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Further, among directions orthogonal to the shoe center axis CX, a direction parallel to a horizontal plane HP may be referred to as a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

Figure 2:
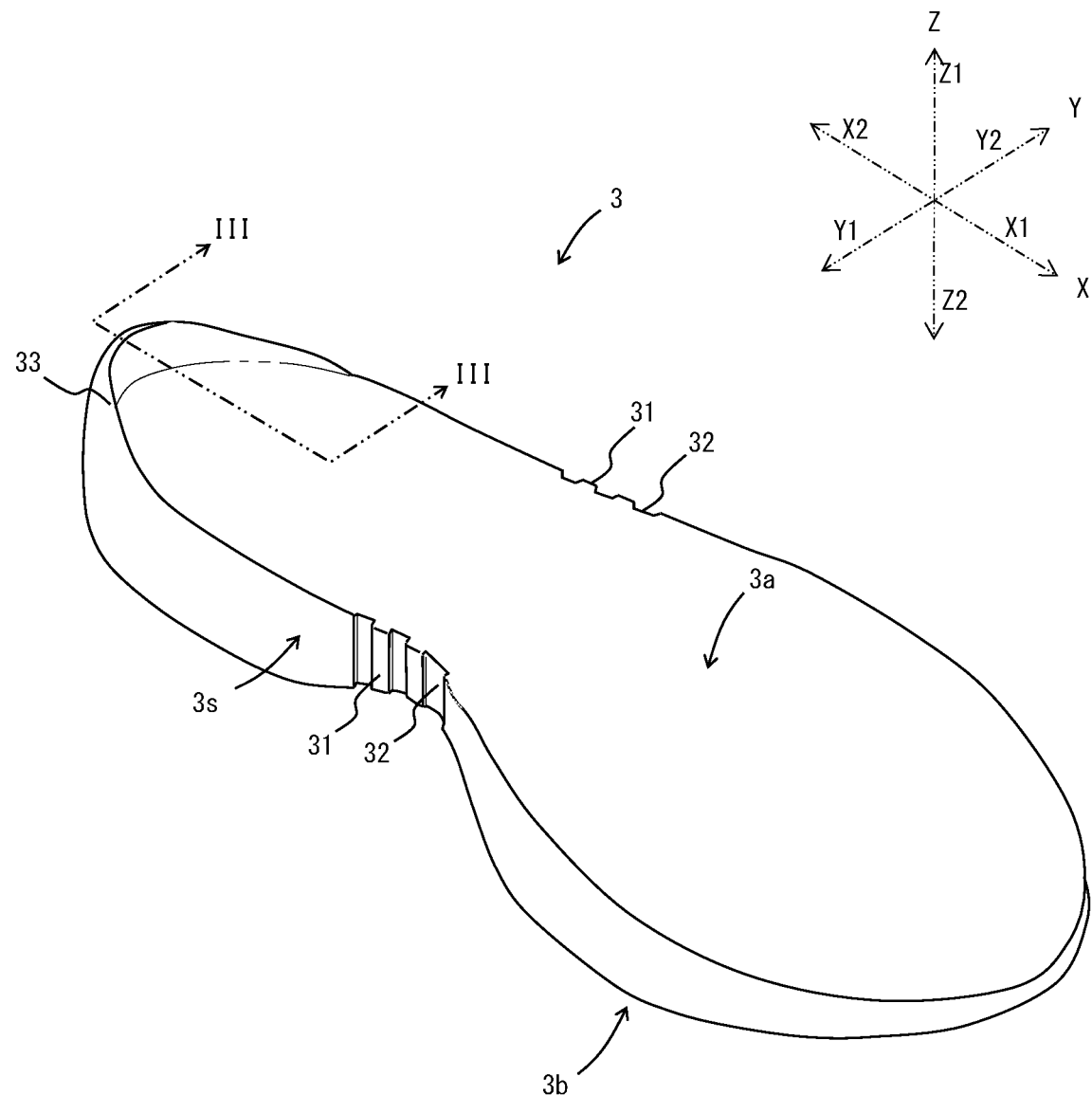
FIG. 2 is a perspective view of a shoe sole member according to one embodiment.
Figure 3:
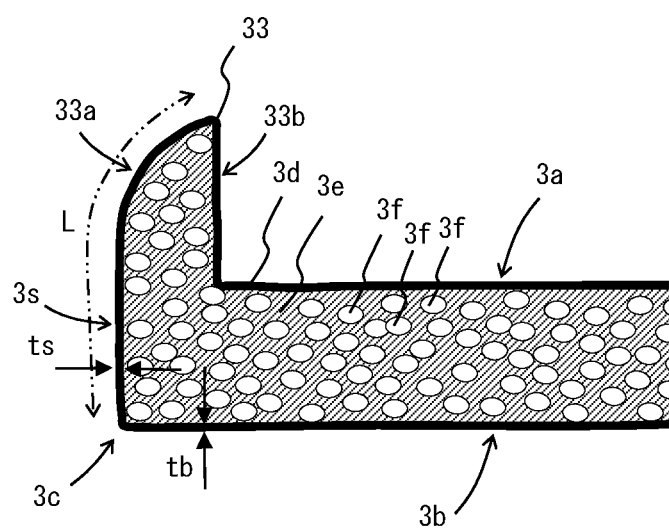
FIG. 3 is a cross-sectional view as viewed in the direction of arrows of III-III in FIG. 2.
Figure 4:
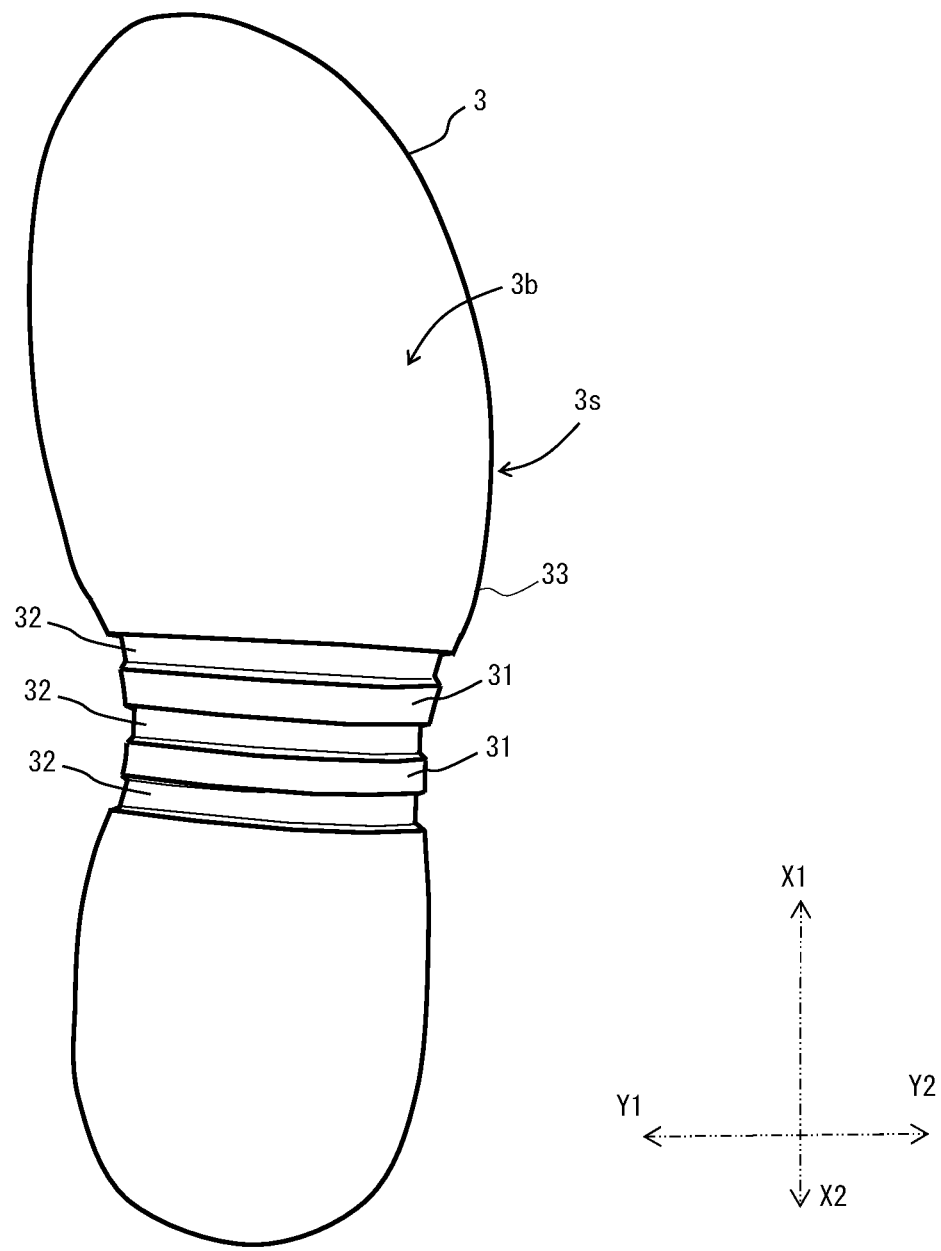
FIG. 4 is a bottom view of the shoe sole member according to the one embodiment.

As shown in FIG. 1, the shoe 1 of this embodiment includes the outsole 4 in its bottommost position. The outsole 4 of this embodiment has a sheet shape, and is arranged in the lowermost part of the shoe 1 to have the thickness direction corresponding to the vertical direction Z. The shoe 1 includes the midsole 3 between the outsole 4 and the upper 2 that covers a foot of a wearer from the upper side. The midsole 3 of this embodiment is formed of a plate-shaped foam having a larger thickness than the thickness of the outsole 4, and is arranged to have the thickness direction corresponding to the height direction Z of the shoe, as shown in FIG. 2, FIG. 3, and FIG. 4. The midsole 3 has a lower surface 3b that is bonded to an upper surface of the outsole 4, an upper surface 3a that is bonded from below to the upper 2, and a lateral surface 3s that connects together the outer edges of the upper surface 3a and the lower surface 3b. The lateral surface 3s of the midsole 3 is formed to circulate around the outer periphery of the midsole 3 along the outer edges of the upper surface 3a and the lower surface 3b. In other words, the upper surface 3a is formed to extend inward from the upper end of the lateral surface 3s, and the lower surface 3b is formed to extend inward from the lower end of the lateral surface 3s.

The entire lateral surface 3s except a part of the toe portion of the midsole 3 is exposed on the outer peripheral surface of the shoe sole. That is, the outer peripheral surface of the shoe sole has the upper side constituted by the lateral surface 3s of the midsole 3, and has the lower side constituted by a lateral surface 4s of the outsole 4.

The midsole 3 is composed of a foam as shown in FIG. 2. The foam constituting the midsole 3 has a surface constituted by a non-foamed film 3d, as shown in FIG. 3. That is, the foam is constituted by a surface portion that is a non-foamed region, and a portion inside the non-foamed region that includes cells 3f. The foam constituting the midsole 3 of this embodiment is an injection molded article as will be described in detail later, and includes a foamed region 3e and the film 3d covering the foamed region 3e that are both composed of the same polymer composition.

In this embodiment, at least a part of the film 3d covering the surface of the midsole 3 is a thick film having a thickness of 50 μm or more. The thick film is provided on the lateral surface 3s of the midsole 3. The thick film acts effectively to exhibit excellent stiffness when the midsole 3 is bent or twisted.

The stiffness exhibited on the midsole 3 can be adjusted mainly by, for example, the thickness of the film 3d. The stiffness can be adjusted by devising the shape of the midsole 3 so that the film 3d has a corrugated shape. The stiffness can also be adjusted by considerably determining what degree of thickness of the film 3d is to be applied to which part of the midsole 3. That is, in this embodiment, the midsole can exhibit a desired stiffness without excessively reducing the expansion ratio of the foamed region or selecting a hard resin having a high elastic modulus as a base resin of the polymer composition constituting the foam. Thus, in this embodiment, the midsole 3 can be constituted by a foam having both high stiffness and excellent shock absorbing properties.

In order to form the midsole 3 having excellent shock absorbing properties, the expansion ratio of the foamed region 3e in the foam is preferably 2 times or more. In order to form the midsole 3 having high stiffness, the expansion ratio of the foamed region 3e in the foam is preferably 7 times or less, more preferably 6 times or less. The expansion ratio of the foamed region 3e can be determined by preparing a sample of the foam from which the film 3d is removed, and measuring the apparent density and the true density of the sample. The apparent density of the sample can be measured, for example, based on the method described in JIS K7222:2005 "Cellular plastics and rubbers—Determination of apparent (bulk) density". The true density of the sample can be determined by, for example, hot-pressing the sample into a non-foamed product. The true density of the sample can be obtained by measuring the density of the non-foamed product by the method A (Underwater displacement) of JIS K7112:1999 "Plastics—Methods of determining the density and relative density of non-cellular plastics". The measurement of true density can also be determined by using the film 3d as a measurement sample in substitution for the non-foamed product made of the sample that has been hot-pressed. The expansion ratio can be determined by the formula below:

Expansion ratio=True density/Apparent density

The foam in this embodiment includes a thick film having a thickness of 50 μm or more, as described above. In order to form the midsole 3 having both high stiffness and excellent shock absorbing properties, the foam preferably includes a thick film having a thickness of 100 μm or more, more preferably includes a thick film having a thickness of 120 μm or more, particularly preferably includes a thick film having a thickness of 150 μm or more. The foam preferably has 50% or more in area of the lateral surface 3s constituted by the aforementioned thick film, more preferably has 70% or more constituted by the aforementioned thick film, particularly preferably has 90% or more constituted by the aforementioned thick film. It is preferable that the foam have not only the lateral surface 3s but also the upper surface 3a and the lower surface 3b each constituted by the aforementioned thick film at the above proportions.

It is preferable that at least a part of the aforementioned thick film continuously extend from the lateral surface 3s to the lower surface 3b. It is more preferable that the thick film continuously extending from the lateral surface 3s to the lower surface 3b continuously extend to the upper surface 3a. Where the average thickness of the thick film on the lateral surface 3s is $t_1$ (μm) and the average thickness of the film on the lower surface 3b is $t_2$ (μm), the foam preferably satisfies the following relational expressions (1) and (2) below:

$$0.8 \leq (t_2/t_1) \leq 1.25 \tag{1}$$

$$50 \leq t_1 \leq 300 \tag{2}$$

The average thickness $t_1$ (μm) of the thick film on the lateral surface 3s can be determined by dividing a cross-sectional area of the thick film by the length (represented by the sign L in FIG. 3) of the thick film. The cross-sectional area of the thick film is obtained by cutting the thick film along a plane orthogonal to the thick film and parallel to the height direction (Z) of the shoe 1. The average thickness $t_2$ (μm) of the thick film on the lower surface 3$b$ can also be determined in the same manner as in the average thickness $t_1$ (μm) on the lateral surface 3$s$. The thickness of the thick film at a corner portion 3$c$ at which the lateral surface 3$s$ and the lower surface 3$b$ cross each other is preferably larger than the average thickness $t_1$ (μm) on the lateral surface 3$s$ and the average thickness $t_2$ (μm) on the lower surface 3$b$.

The thick film that satisfies the relational expressions (1) and (2) may be arranged in any of the forefoot portion 11, the midfoot portion 12, and the hindfoot portion 13, of the shoe 1. The thick film that satisfies the relational expressions (1) and (2) is preferably arranged in at least one of the forefoot portion 11 and the midfoot portion 12, more preferably arranged in both of these portions. The thick film that satisfies the relational expressions (1) and (2) is preferably provided in an area of the lateral surface 3$s$ accounting for 50% or more of the peripheral length of the lateral surface 3$s$, more preferably provided in an area accounting for 70% or more, particularly preferably provided in an area accounting for 90% or more.

The foam of this embodiment has a rising portion 33 which is an upwardly extended sidewall portion protruding upward in the outer peripheral portion of the foam to support a heel of a wearer of the shoe 1, and the rising portion 33 has an outer surface 33$a$ on which the thick film is provided. The rising portion 33 of this embodiment has a plate-shaped structure standing upward and extending along the outer peripheral portion of the foam, and is arranged in the hindfoot portion 13 of the shoe 1. Further, the rising portion 33 of this embodiment is arranged to cover the heel from three sides namely: the medial side, the lateral side, and the rear side. The height of the rising portion 33 is preferably 5 mm or more.

The rising portion 33 suppresses the heel of the wearer from moving out of the shoe sole to the medial side (Y1) or the lateral side (Y2). This configuration allows the shoe 1 in this embodiment to be better fitted to the foot of the wearer. The rising portion 33 of this embodiment functions similarly to the heel counter 53$x$ provided in the conventional shoe 1$x$. The shoe 1 of this embodiment may include a heel counter in substitution for the rising portion 33, or may include both the rising portion 33 and the heel counter.

The rising portion 33 may be arranged on the lateral side of the forefoot portion 11. In this case, the rising portion 33 is arranged to cover the fifth toe of the wearer from the lateral side, which can suppress the toe of the wearer from moving out of the shoe sole to the lateral side (Y2). The rising portion 33 in this case functions similarly to the stabilizer 52$x$ provided in the conventional shoe 1$x$. The shoe 1 of this embodiment may include the stabilizer in substitution for the rising portion 33, or may include both the rising portion 33 and the stabilizer.

The rising portion 33 may be arranged in an arch portion (i.e., the medial side of the midfoot portion 12). The rising portion 33 in this case functions similarly to the shank member 51$x$ provided in the conventional shoe 1$x$. The shoe 1 of this embodiment may include the shank member in substitution for the rising portion 33, or may include both the rising portion 33 and the shank member.

The rising portion 33 may be arranged in only one or more than one position of the aforementioned positions. The shoe 1 of this embodiment may include only one or more than one members of the reinforcing members such as the shank member, the stabilizer, and the heel counter. These reinforcing members can usually be formed of a polymer composition harder (i.e., having a larger durometer hardness value) than the midsole. In this embodiment in which the midsole causes the shoe sole to exhibit excellent stiffness, these reinforcing members may be smaller or thinner than the conventional members. Since the midsole causes the shoe sole to exhibit excellent stiffness, the reinforcing members of this embodiment need not be composed of a hard resin, and can be composed of a polymer film, a leather sheet, a fiber sheet, or the like. Thus, the shoe of this embodiment can be lighter in weight than the conventional shoe even when the reinforcing members are employed.

The rising portion 33 in this embodiment has an inner surface 33$b$ used for being bonded to the upper 2. In order to exhibit the excellent capability for following the deformation of the upper 2, the thickness of the film 3$d$ on the inner surface 33$b$ of the rising portion 33 is preferably smaller than the thickness of the film 3$d$ on the outer surface 33$a$. The thickness of the film 3$d$ on the inner surface 33$b$ of the rising portion 33 is preferably less than 150 μm even in the thickest portion. The maximum thickness of the film 3$d$ on the inner surface 33$b$ is more preferably less than 100 μm, particularly preferably less than 50 μm. In order to exhibit the excellent anchor effect to the bond, the film may be cut off in at least a part of the region on the inner surface 33$b$ of the rising portion 33 to bring the region into the state where the cells of the foam are open. That is, a part or the whole of the inner surface 33$b$ may be a cut surface formed by cutting the foam. For the same reason, a part of the upper surface 3$a$ and/or the lower surface 3$b$ may be the cut surface.

The foam constituting the midsole 3 in this embodiment includes a rib 31 extending in the midfoot portion 12 along the width direction Y of the shoe 1 on the lower surface side, as shown in FIG. 4. In the foam of this embodiment, the rib 31 is covered by the thick film. The rib 31 acts effectively to cause the midsole 3 to exhibit excellent stiffness when the midsole 3 is twisted. This configuration enables the shoe 1 of this embodiment to obtain an excellent reinforcing effect without a shank member. The rib 31 of this embodiment is formed to cross the foam and rise in the both lateral surfaces 3$s$ of the foam through the corner portions 3$c$. In this embodiment, a plurality of ribs 31 are provided, and are arranged to be parallel to each other at intervals. A gap between each rib 31 and each adjacent rib 31 constitutes a groove 32 crossing the foam. In order to cause the groove 32 and the rib 31 to more remarkably exhibit the reinforcing effect, a difference in height between the groove 32 and the rib 31 is preferably 1 mm or more, more preferably 2 mm or more. The difference in height is preferably 10 mm or less. A distance between each adjacent ribs 31 is preferably 20 mm or less, more preferably 15 mm or less. The distance is preferably 3 mm or more.

The midsole 3 of this embodiment having the ribs 31 and the grooves 32 has an uneven part in which recesses inward of the lateral surface 3$s$ and projections outward thereof are alternately present in the length direction X of the shoe 1. That is, the midsole 3 of this embodiment has the uneven part formed by the rib(s) 31 and the groove(s) 32 that project and are recessed in the vertical direction Z. Moreover, in this embodiment, the uneven part is arranged on the medial side of the midfoot portion 12 of the shoe 1. This configuration allows the midsole 3 of this embodiment to exhibit high stiffness when the medial side of the midfoot portion 12 is subjected to compression force. Thus, the midsole 3 of this embodiment can prevent a leg of the wearer from falling inward.

In the midsole 3 of this embodiment, the uneven part is arranged also on the lateral side of the midfoot portion 12 of the shoe 1. This configuration enables the midsole 3 of this embodiment to prevent the leg of the wearer from falling on the lateral side and to effectively act on the wearer's stable walking. The uneven part is preferably formed to have a length of 10 mm or more, more preferably formed to have a length of 20 mm or more, in the length direction X of the shoe 1. The midsole 3 of this embodiment may have an uneven part in which recesses inward of the lateral surface 3s and projections outward thereof are alternately present in the thickness direction (vertical direction Z) of the midsole.

The foam constituting the midsole 3 can be prepared by molding a polymer composition including a base polymer and a foaming agent using, for example, a molding die, in the course of which the film 3d can be formed.

Examples of the base polymer of the polymer composition include olefin polymers such as polyethylene (e.g., linear low-density polyethylene (LLDPE) and high-density polyethylene (HDPE)), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylate copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylate copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), and propylene-vinyl acetate copolymer.

Examples of the base polymer include: polyamide-based resins such as polyamide 6, polyamide 11, polyamide 12, polyamide 66, and polyamide 610; and polyester-based resins such as polyethylene terephthalate and polybutylene terephthalate.

Examples of the base polymer include a polyurethane-based polymer such as a polyester-based polyurethane or a polyether-based polyurethane; and a styrene-based polymer such as styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), polystyrene, acrylonitrile styrene resin (AS resin), or acrylonitrile butadiene styrene resin (ABS resin).

Examples of the base polymer may include a fluorine-based polymer such as fluororesin and fluororubber; a polyvinyl chloride-based resin; an acrylic resin such as polymethyl methacrylate; a silicone-based elastomer; butadiene rubber (BR); isoprene rubber (IR); chloroprene (CR); natural rubber (NR); styrene butadiene rubber (SBR); acrylonitrile butadiene rubber (NBR); or butyl rubber (IIR).

The polymer composition may include a crosslinking agent for crosslinking the base polymer as required.

As the crosslinking agent, an organic peroxide, a maleimid-based crosslinking agent, sulfur, a phenolic crosslinking agent, oximes, and polyamine, for example, can be employed. Further, crosslinking of the base polymer may be performed by irradiating an electron beam or an X-ray.

Examples of the organic peroxide include dicumyl peroxide, di-t-butyl peroxide, 2,5-dimethyl-2,5-di-4-butylperoxykexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxybenzoate, t-butylperoxyisopropyl carbonate, diacetyl peroxide, lauroyl peroxide, and t-butylcumyl peroxide.

The polymer composition may include a plurality of polymers and may include a plurality of crosslinking agents. The polymer composition may further include an inorganic filler such as clay, talc, silica, or carbon black. The foaming agent for causing the polymer composition to foam is not particularly limited, and examples thereof include an organic-based or inorganic-based chemical foaming agent and a physical foaming agent. As the foaming agent, one or more selected from: an azo compound such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile), or 2,2'-azobis[N-(2-carboxyethyl)-2-methyl-propionamidine]; a nitroso compound such as N,N'-dinitrosopentamethylenetetramine (DPT); a hydrazine derivative such as 4,4'-oxybis(benzenesulfonylhydrazide) or diphenylsulfone-3,3'-disulfonylhydrazide; a semicarbazide compound such as p-toluenesulfonyl semicarbazide; and an organic heat decomposable foaming agent such as trihydrazinotriazine can be employed.

As the foaming agent, one or more selected from thermally decomposable inorganic foaming agents such as bicarbonates, e.g., sodium hydrogen carbonate and ammonium hydrogen carbonate, and carbonates, e.g., sodium carbonate and ammonium carbonate; nitrites such as ammonium nitrite, and hydrogen compounds can be employed.

As the foaming agent, an organic foaming agent such as various aliphatic hydrocarbons, e.g., methanol, ethanol, propane, butane, pentane, and hexane, or an inorganic foaming agent such as air, carbon dioxide, nitrogen, argon, and water can be used. The inorganic foaming agent is preferably used under such conditions as to be a supercritical fluid.

The polymer composition may further include one or more selected from, for example, a processing aid, a weathering agent, a flame retardant, a pigment, a mold release agent, an antistatic agent, an antibacterial agent, and a deodorizer.

The method for forming the foam using the polymer composition is not particularly limited, but an injection molding method is preferably employed in terms of easily forming the film 3d into a desired state, and the core back method in which the heated and molten polymer composition is injected into a cavity of the forming mold, and thereafter the volumetric capacity of the cavity is increased to cause the polymer composition to foam is above all preferably employed.

Figure 5A:
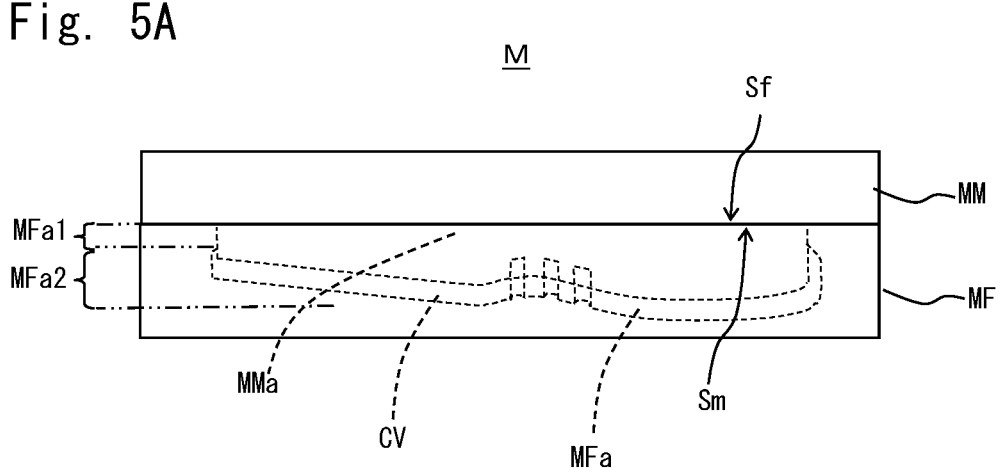
FIG. 5A is a schematic front view of a forming mold for making the shoe sole member of the one embodiment.
Figure 5B:
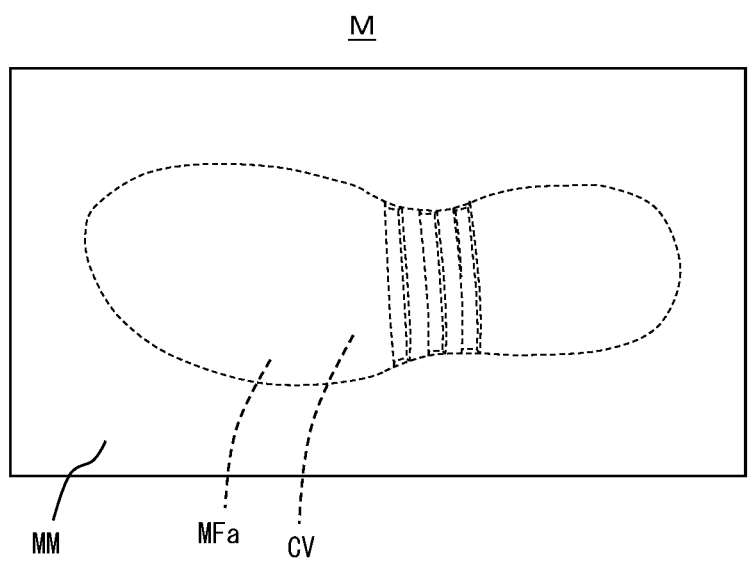
FIG. 5B is a schematic plan view of the forming mold for making the shoe sole member of the one embodiment.
Figure 5C:
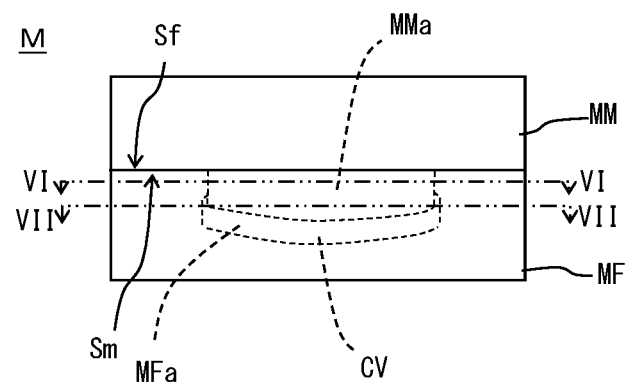
FIG. 5C is a schematic side view of the forming mold for making the shoe sole member of the one embodiment.

In order to prepare the foam constituting the midsole 3 by the core back injection molding, for example a forming mold M as shown in FIG. 5A, FIG. 5B, and FIG. 5C is used. As shown in the figures, the forming mold M is composed of a pair of molds respectively having molding surfaces Sf and Sm that come into contact with each other when the forming mold M is closed. The forming mold M has a male mold MM and a female mold MF as the pair of molds. The forming mold M is configured to be able to form a tightly closed molding space CV inside thereof by joining the male mold MM and the female mold MF to each other. The forming mold M has an inlet IL through which the polymer composition molten and kneaded in an injection molding machine is introduced from the injection molding machine to the molding space CV.

The forming mold M is configured to be able to form the molding space CV inside thereof when the mold is closed. The molding space CV has a shape in plan view the same as that of the foam, and has a shape in side view thinner than that of the foam. The forming mold M is formed so that a molding space CV' formed inside thereof in the state where a gap is formed between the molding surface Sm of the male mold MM and the molding surface Sf of the female mold MF has such a shape as to correspond to the shape of the foam. That is, the forming mold M used in this embodiment is capable of switching between a first state in which the molding space CV having a smaller volumetric capacity than the foam to be prepared is formed inside the forming mold M and a second state in which the forming molding CV' having a larger volumetric capacity than that in the first state is formed inside the forming mold M.

Figure 6:
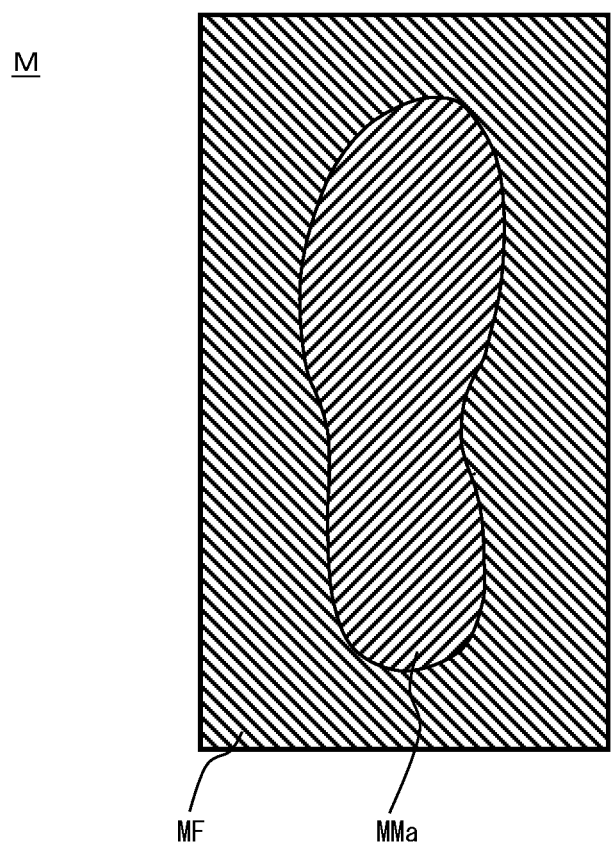
FIG. 6 is a cross-sectional view as viewed in the direction of arrows of VI-VI in FIG. 5C.
Figure 7:
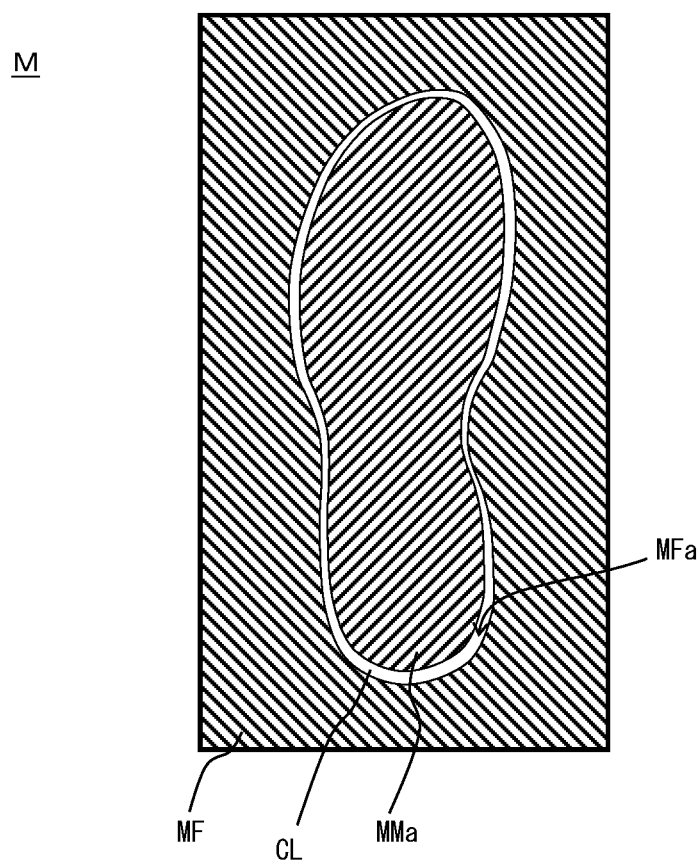
FIG. 7 is a cross-sectional view as viewed in the direction of arrows of VII-VII in FIG. 5C.

The female mold MF has a molding recess MFa that is open on a side having the molding surface Sf and recesses in a thickness direction of the female mold MF. The molding recess MFa is formed so that its depth direction corresponds to the thickness direction of the midsole 3. The male mold MM has a molding projection MMa that projects from the molding surface Sm and can project into the molding recess MFa of the female mold MF. The cross-sectional area of the molding recess MFa taken at a plane orthogonal to the direction in which the molding projection MMa projects varies in the depth direction. Specifically, the upper portion of the molding recess MFa has a smaller cross-sectional area than that in the lower portion. That is, the forming recess MFa has a small-area region MFa1 having a smaller cross-sectional area in an upper portion in the depth direction than in the lower portion, and a large-area region MFa2 having a larger cross-sectional area in a portion below the small-area region MFa1 than the cross-sectional area of the small-area region MFa1. The cross-sectional area of the molding recess MFa in the small-area region MFa1 has a shape corresponding to the contour shape of the molding projection MMa. The cross-sectional area of the molding recess MFa in the large-area region MFa2 has a shape slightly larger than the contour shape of the molding projection MMa. Thus, when the female mold MF and the male mold MM are joined to each other, the outer peripheral surface of the molding projection MMa and the inner wall surface of the molding recess MFa are held in contact with each other in the small-area region MFa1, as shown in FIG. 6, while a clearance CL is formed therebetween in the large-area region MFa2, as shown in FIG. 7.

Figure 8:
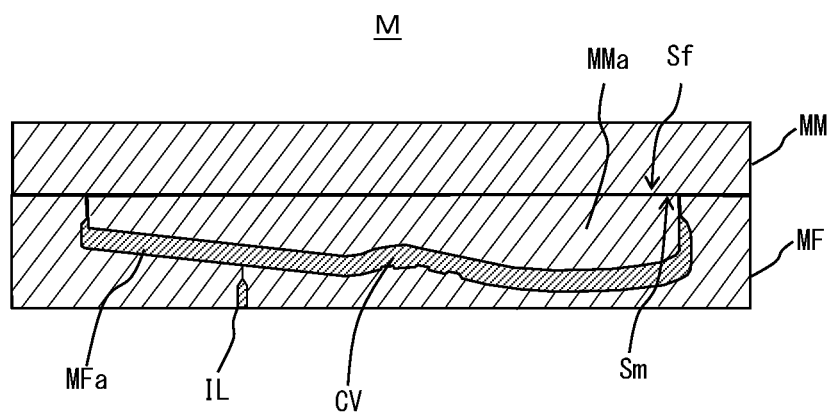
FIG. 8 is a schematic view showing a method for molding the shoe sole member using the forming mold shown in FIG. 5 (first state).
Figure 9:
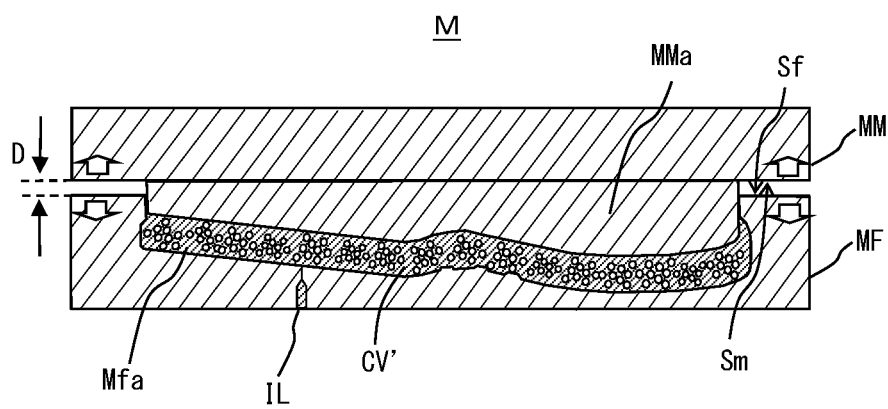
FIG. 9 is a schematic view showing the method for molding the shoe sole member using the forming mold shown in FIG. 5 (second state).
Figure 10:
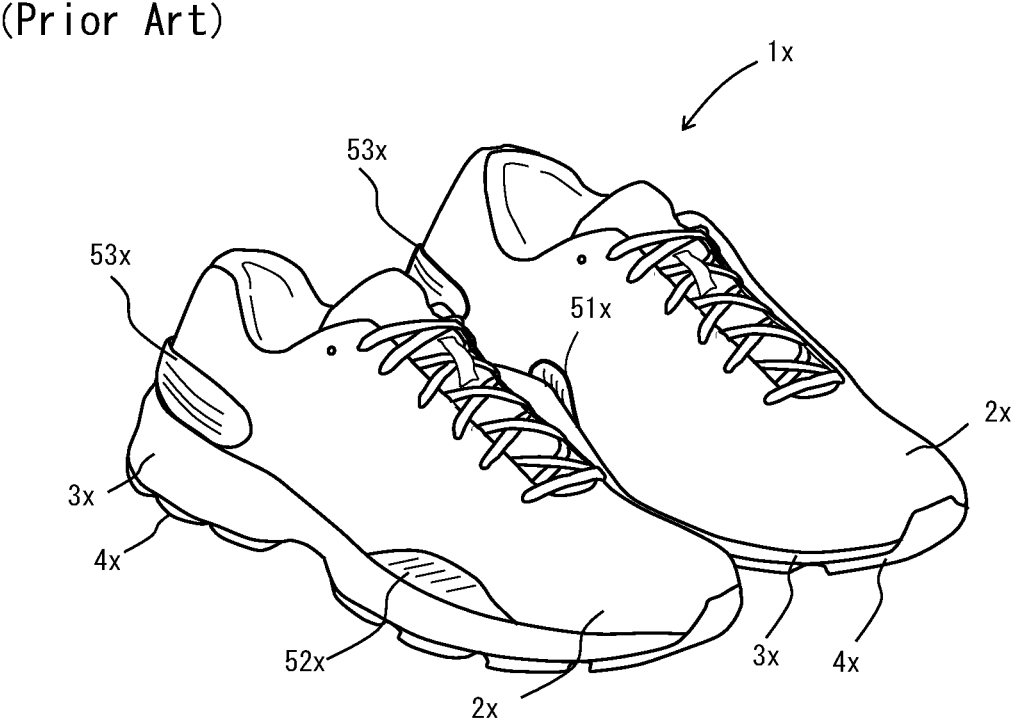
FIG. 10 is a schematic perspective view showing conventional shoes including reinforcing members.

To prepare the foam constituting the midsole 3 by the core back injection molding, the heated and molten polymer composition is injected into the molding space CV of the forming mold M that is held in the first state (FIG. 8), and then causing the forming mold M to change into the second state (FIG. 9). At this time, a distance D is provided between the female mold MF and the male mold MM so that the leading end of the molding projection MMa is located in the small-area region MMa1. Then, a new molding space CV' having a larger volumetric capacity than the molding space CV in the first state is formed in the forming mold to thereby reduce the pressure of the polymer composition and cause the polymer composition to expand into a foam so as to fill the molding space CV'. The foam constituting the midsole 3 is thus prepared.

The polymer composition that has been injected into the molding space CV is cooled by the leading surface of the molding projection MMa and the inner wall surface of the molding recess MFa; thus, the film $3d$ on the surface of the foam can have a large thickness by prolonging the period from the time when the polymer composition is injected into the molding space CV to the time when the molding space CV turns to the second state. The thickness of the film $3d$ can be adjusted also by the temperature conditions (cooling conditions) of the female mold MF and the male mold MM. In order to bring the foamed region $3e$ formed inside the film $3d$ into a favorably foamed state at this time, it is preferable that the polymer composition be injected into the molding space CV under the conditions where the foaming agent is in a supercritical state. The foaming agent used at this time is preferably carbon dioxide, nitrogen, argon, or the like.

As described above, the shoe sole member of the present invention is a shoe sole member composed of a foam. The foam in the present invention is composed of a polymer composition, the polymer composition has a surface composed of a non-foamed film at least partially having a thickness of 50 µm or more, the foam has a lateral surface constituting at least a part of an outer peripheral surface of a shoe sole, and the lateral surface includes the film. Thus, the shoe sole member of the present invention can exhibit stiffness and shock absorbing properties. This embodiment has been described by taking the midsole as an example of the shoe sole member, but the shoe sole member of the present invention is not limited to the midsole.

The foam in the above exemplification is an injection molded article to thereby enable the thickness of the film to be easily adjustable, but the foam of the present invention is not limited to an injection molded article.

The foam in the above exemplification includes a lower surface extending inward from a lower end of the lateral surface, includes the film continuously extending from the lateral surface to the lower surface, and satisfies the relational expressions (1) and (2) below to exhibit reasonable stiffness where an average thickness of the film on the lateral surface is $t_1$ (µm) and an average thickness of the film on the lower surface is $t_2$ (µm):

$$0.8 \le (t_2/t_1) \le 1.25 \quad (1)$$

$$50 \le t_1 \le 300 \quad (2)$$

Further, in the exemplification above, the film satisfying the relational expressions (1) and (2) is arranged in the forefoot portion of the shoe or in the midfoot portion to enable the provision of the shoe sole member excellent in stiffness and shock absorbing properties, but the present invention does not require the foam to satisfy the relational expressions (1) and (2).

Further, the shoe that can be easily fitted to the foot of the wearer by arranging the rising portion in the hindfoot portion has been exemplified above, but the shoe sole member of the present invention does not have to include the rising portion. That is, the shoe sole member of the present invention and the shoe of the present invention are not limited to the aforementioned exemplification at all.

REFERENCE SIGNS LIST

1: Shoe
2: Upper
3: Midsole
$3d$: Film
$3e$: Foamed region
$3s$: Lateral surface
4: Outsole 11: Forefoot portion
12: Midfoot portion
13: Hindfoot portion
33: Rising portion

The invention claimed is:

1. A shoe sole member comprising:
a foam comprising a polymer composition, the foam having a lateral surface constituting at least a part of the shoe sole member, and a bottom surface of the shoe sole member extending inward from a lower end of the lateral surface of the foam; and
a non-foamed film continuously extending from the lateral surface to the bottom surface; wherein
the foam has an upwardly extended sidewall portion at an outer peripheral portion of the foam,
the non-foamed film is provided on an outer surface and an inner surface of the upwardly extended sidewall portion such that the upwardly extended sidewall portion is entirely encapsulated by the non-foamed film,
the upwardly extended sidewall portion has an upper distal end,
the upwardly extended sidewall portion of the foam continuously extends from the lateral surface of the foam to the upper distal end of the non-foamed film;
an entirety of the non-foamed film on the outer surface has a larger thickness than the non-foamed film on the inner surface, and the non-foamed film on the inner surface has a maximum thickness of less than 150 μm; and
the non-foamed film at least partially has a thickness of 50 μm or more.

2. The shoe sole member according to claim 1, wherein the foam is an injection molded article.

3. The shoe sole member according to claim 2, wherein the foam is the injection molded article formed by a core back method.

4. The shoe sole member according to claim 1, wherein the shoe sole member satisfies relational expressions (1) and (2) below where an average thickness of the non-foamed film on the lateral surface is $t_1$ (μm) and an average thickness of the non-foamed film on the bottom surface is $t_2$ (μm):

$$0.8 \leq (t_2/t_1) \leq 1.25 \quad (1)$$

$$50 \leq t_1 \leq 300 \quad (2)$$

5. The shoe sole member according to claim 4, wherein the non-foamed film-satisfies the relational expressions (1) and (2), and is arranged in a forefoot portion of the shoe sole member.

6. The shoe sole member according to claim 4, wherein the non-foamed film satisfies the relational expressions (1) and (2), and is arranged in a midfoot portion of the shoe sole member.

7. The shoe sole member according to claim 1, wherein the upwardly extended sidewall portion has a height of 5 mm or more.

8. The shoe sole member according to claim 7, wherein the upwardly extended sidewall portion is arranged in a hindfoot portion of the shoe sole member to cover a heel portion from a medial side, a lateral side, and a rear side of the heel portion.

9. The shoe sole member according to claim 7, wherein the upwardly extended sidewall portion is arranged in a lateral side of a forefoot portion of the shoe sole member.

10. The shoe sole member according to claim 7, wherein the upwardly extended sidewall portion is arranged on a medial side of a midfoot portion of the shoe sole member.

11. A shoe comprising the shoe sole member according to claim 7.

12. The shoe sole member according to claim 1, comprising:
a rib covered with the non-foamed film, the rib extending along a width direction of the shoe sole member on the bottom surface of the shoe sole member.

13. The shoe sole member according to claim 1, wherein the upwardly extended sidewall portion is arranged in a hindfoot portion of the shoe sole member to cover a heel portion from a medial side, a lateral side, and a rear side of the heel portion.

14. The shoe sole member according to claim 1, wherein the upwardly extended sidewall portion is arranged in a lateral side of a forefoot portion of the shoe sole member.

15. The shoe sole member according to claim 1, wherein the upwardly extended sidewall portion is arranged on a medial side of a midfoot portion of the shoe sole member.

16. A shoe comprising the shoe sole member according to claim 1.

17. The shoe sole member according to claim 1, wherein the non-foamed film entirely encapsulates the foam.

* * * * *